March 3, 1931.  C. H. COX  1,794,672
AIR GAUGE
Filed Jan. 11, 1928
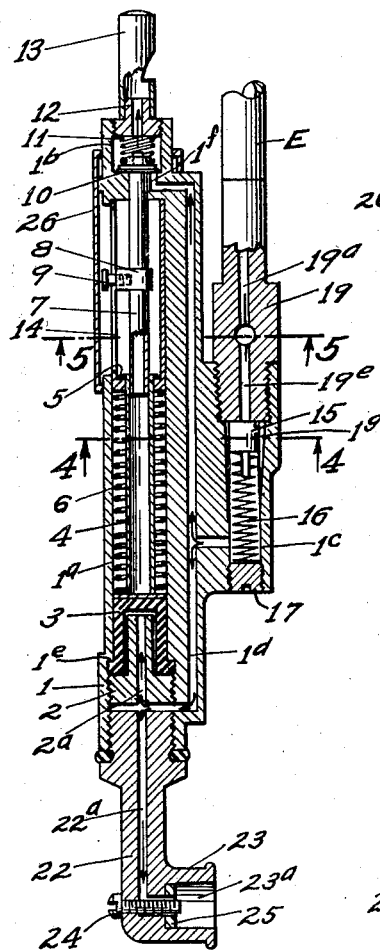
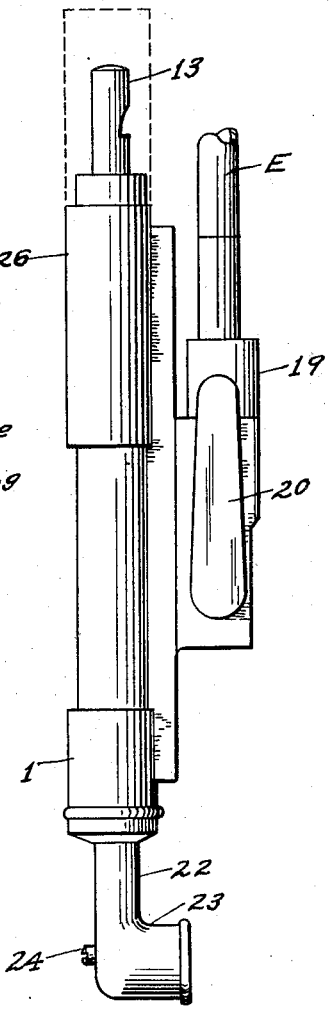
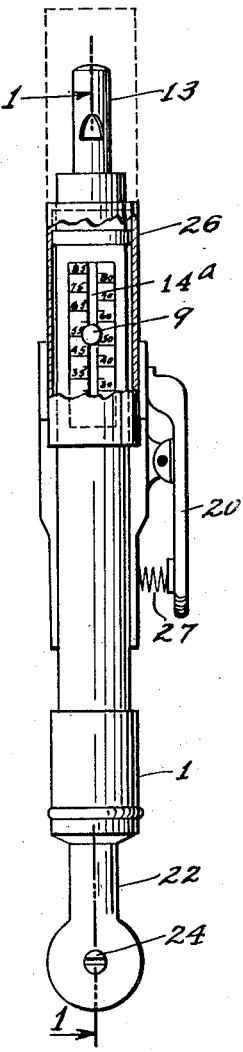
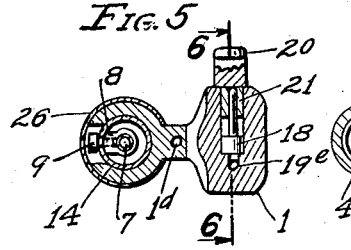
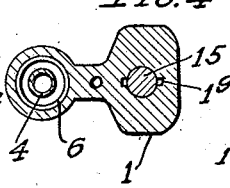
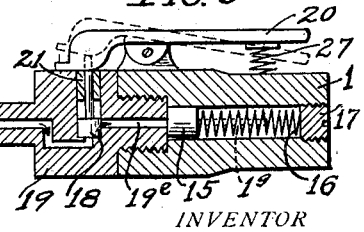
INVENTOR
CHARLES H. COX
BY A. B. Bowman
ATTORNEY Patented Mar. 3, 1931

1,794,672

UNITED STATES PATENT OFFICE

CHARLES H. COX, OF LOS ANGELES, CALIFORNIA

AIR GAUGE

Application filed January 11, 1928. Serial No. 246,052.

My invention relates to an air gauge, especially adapted for the inflation of automobile tires.

The objects of this invention are: first, to provide a device of this class which permits the operator to predetermine the air pressure desired in the tire, which permits the operator, during inflation of the tire, to note the increase of air pressure therein, and which, when the air in the tire is raised to the predetermined pressure, will audibly signal the operator without removing the device from the tire valve stem or the tire check valve; second, to provide a device of this class which is simple and economical of construction, durable, efficient, easy to operate and control, readily adaptable for installation on a tire inflating hose, and a device of this class which will not readily deteriorate or get out of order; third, to provide a device of this class so constructed that, by a slight and quick adjustment of the mechanism, any ordinary tire air pressure desired may be accurately determined before inflation of the tire; fourth, to provide a device of this class in which the air pressure measuring means, the pressure relief valve, and the audible signaling means is controlled directly by the air at substantially the pressure of the air in the tire, and in which the pressure adjusting means and pressure relief valve, or valve for controlling the audible signalling means, and their respective associated parts, may be made very light of construction by reason of the action of the air under tire pressure only thereon; fifth, to provide a novel valve means for equalizing the air pressure within the gauge irrespective of the pressure of the air from the source of supply; sixth, to provide novel means for adjusting the device to function at a predetermined pressure; and, seventh, to provide as a whole a novelty constructed air gauge for automobile tires.

With these and other objects in view, as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a longitudinal sectional view of my air gauge in its preferred form of construction, certain parts and portions being shown in elevation to facilitate the illustration; Fig. 2 is a side view thereof; Fig. 3 is a side view thereof taken at a right angle to that of Fig. 2 and showing certain parts thereof broken away and in section to facilitate the illustration; Figs. 4 and 5 are, respectively, transverse sectional views thereof taken through 4—4 and 5—5 of Fig. 1; and Fig. 6 is a sectional view thereof taken through 6—6 of Fig. 5.

Like characters of reference refer to similar parts and portions throughout the views of the drawings.

My air gauge, as referred to above, is a combination device for coupling an air hose to the tire valve stem of an automobile, a valve means for controlling the flow of air from the hose to the tire valve stem, means for measuring the pressure of the air in the tire, and means for audibly signaling to the operator when the tire is filled with air to a predetermined pressure.

The various features referred to above are embodied in a single device and all of which cooperate to facilitate the inflating of pneumatic tires. These several features or structural portions are also supported in or on a unitary base or casing 1. To one side of the casing 1 is connected an air hose connection fitting 19 to which is connected a flexible air hose E. To the end of the casing 1, opposite the air hose E, is secured the tire inflating coupling 22 having a central air passage 22a having at its outer end a right angle coupling portion 23 with a recess 23a therein communicating with the passage 22a and adapted to receive the outer end of the tire valve stem. At the bottom of the recess is a rubber gasket 25 for sealing the joint between the coupling member 22 and the tire valve stem. Into the recess 23 extends a screw 24 past the gasket 25 for engaging the stem of the check valve of the tire valve stem for unseating the check valve.

In the casing 1 are two axially aligned large cylindrical passages 1a and 1b, said passages being also aligned with the securing portion of the coupling member 22. One end of the chamber 1a communicates with the bore in which the securing plug portion of the coupling 22 extends. In the chamber 1a at the end thereof adjacent the coupling member is positioned a rubber sleeve or cup member 3 which is positioned with its open portion directed forwardly or toward the coupling member and is secured by an annular shoulder at the outer end thereof against an annular shoulder 1e within the chamber 1a by a threaded plug 2. This plug 2 is provided with an axial bore for conducting air under pressure into the interior of the rubber cup-shaped member 3. Within the chamber 1a and against the head end of the rubber cup-shaped member is positioned a tube 4 of a diameter smaller than the chamber 1a, but with a head at one end covering preferably the whole of the head of the rubber sleeve or cup. The tube 4 is reciprocally mounted within the chamber 1a and is adapted to extend with its other end into an index tube 14. The end of the tube 4 which extends into the index tube 14 is also provided with an enlarged portion which engages the inner side or head of the tube 14 to prevent withdrawal therefrom. The index tube 14 is also positioned within and substantially fills the opposite end of the chamber 1a. Within the chamber 1a and around the tube 4 is positioned a compression spring 6 which is adapted to retain the enlarged portion 5 of the tube 4 against the inner head of the index tube 14 and is adapted to act in opposition to the elongation of the rubber cup 3 when the latter is elongated by the pressure of the air. In the index tube 14 is reciprocally mounted a valve stem 7, this stem extending through the head separating the chambers 1a and 1b and extending with its inner end into the tube 4. On the outer end of the stem 7 is secured a disc valve 10 which is adapted to close the discharge end of an air passage 1f, to be referred to hereafter. On the stem 7 is slidably mounted a lug or stop 8 which is adjustably secured to the stem by a set screw 9 which extends into the side of the stop and also through a longitudinal slot at the outer side of the index tube 14. The position of the stop 8 is adjusted by the screw 9 from the outer side of the index tube. On the outer side of the index tube and at the opposite sides of the slot 14a therein are graduations for indicating the positions at which the stop 8 is to be set. The shoulder 5 of the tube 4 is adapted to be forced outwardly toward the stop 8 and to engage the same for unseating the valve 10 to permit free discharge of air. The enlarged portion 5 may be seen through the slot 14a and it also serves as a visible index for determining momentarily the pressure of the air in the tire.

Over the outer end of the chamber 1b is secured a plug 12 which is provided with an axial bore for permitting the discharge of air at the valve 10 from the passage 1f. Around the outer end of the plug 12 is secured a whistle 13 for audibly signaling to the operator when the air in the tire has been raised to a predetermined point. Within the chamber 1b and between the plug 12 and the valve 10 is positioned a compression spring 11 for normally forcing the valve stem against its seat. The unseating of the valve 10 not only serves to permit air to operate the whistle, but also serves as a relief valve so that more air cannot be forced into the tire.

Over the portion of the casing 1 in which the index tube 14 is positioned and from which tube 14 the set screw 9 extends, there is preferably provided a removable cover 26 which is in the present instance a tubular member 26 slidably mounted over this portion of the casing, as shown best in Figs. 1, 3 and 5.

The hose connection fitting 19 is secured in one end of the chamber 1c provided in the casing 1 at one side of and parallel to the chamber 1a. At the opposite end of the chamber 1c is secured a plug 17. Against the inner end of the fitting 19 is positioned a valve 15 which seats against the inner end of the fitting 19. Between the plug 17 and the valve 15 is a compression spring 16 normally forcing the valve 15 against its seat. In the wall of the chamber 1c around the valve 15 are longitudinal grooves 1g which converge inwardly from the inner end of the fitting 19. When air at high pressure is directed against the valve 15 through the hose E for unseating the same the valve is forced inwardly a greater distance against the force of the spring 15 and the passages of the grooves or the bypasses around the valve or plunger 15 are reduced to a greater extent than when air at less pressure is forced thereagainst from the hose E, thus equalizing or standardizing the pressure of the air flowing into the passage 1b, the gauge elements and into the tire. In the fitting 19 is a passage 19a connecting the hose E with the chamber 1c. The passage 19a is offset within the fitting 19, as shown best in Fig. 6. In the fitting is reciprocally mounted a valve 18 which is adapted to intercept the passage 19a at one of the offset portions therein, as shown in Fig. 6. The stem of the valve 18 extends outwardly to the side of the fitting through a collar 21 adapted to seal the space around the stem. To the outer side of the casing 1 is pivotally connected an air control valve lever 20. This lever is pivotally mounted intermediate its ends, is positioned with one end at and over the extended end of the stem of the valve 18 and is adapted normally to force said valve inwardly by a compression spring 27 positioned between the outer end of the lever and the casing 1. When the lever 20 is depressed, the force of the air in the passage 19a forces the valve 18 outwardly and permits the air to be forced against the valve 15 unseating the same and causing air to flow into the chamber 1c. This chamber 1c is connected by means of a passage 1d, with the passage 22a of the coupling member 22 and the passage 2a of the plug 2, as shown best in Fig. 1. The chamber 1c is also connected by the passage 1f, referred to above, with the chamber 1b.

The operation of my air gauge is briefly as follows:

When using my tire inflating means and air gauge, the tube 26 is shifted backwardly uncovering the index portion of the index tube and the adjusting screw 9. The adjusting screw is then unscrewed and the stop or lug 8 is shifted backwardly or forwardly on the stem 7 of the valve 10 until the same is positioned opposite the desired index on the index tube, designating the predetermined pressure at which the tire is to be inflated. The set screw 9 is then tightened against the stem 7. The coupling member 22 is then placed with its recess or coupling portion over the end of the tire valve stem and pressed downwardly thereagainst, opening the check valve of the tire valve stem by the engagement therewith of the screw 24. The lever 20 is then depressed permitting the air under pressure from the hose E to pass into the passages 1d and 1f. From the passage 1d the air passes simultaneously into the passages 22a and 2a at substantially equal pressure. As the pressure in the tire is raised, the rubber cup 3 is elongated compressing the spring 6 and permitting the tube 4 to slide backwardly over the stem 7 a distance proportionate to the pressure in the tire. As the pressure in the tire is raised to the predetermined pressure as indicated on the index, the enlarged portion 5 of the tube 4 engages the stop 8 which, when secured to the stem 7, shifts the stem 7 backwardly and unseats the valve 10 opening the end of the passage 1f and relieving the pressure in the passages 1d and 1f, preventing more air being forced into the tire. The discharge of the air from the passage 1f through the plug 12 and into the whistle 13 gives an audible sound to warn the operator that the tire is filled to the predetermined pressure. The device is then immediately removed from the tire valve stem.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In a device of the class described, a casing having an air inlet and an air discharge coupling at one end, said casing having passage means connecting the inlet with the coupling, a pressure gauge mechanism in the casing and in cooperative relation with the passage means, and a pressure equalizing valve interposed in the passage means of the casing intermediate the inlet and the pressure gauge mechanism, said valve comprising a spring actuated piston operating in a cylinder of varying cross sectional area.

2. In a device of the class described, a casing having an air inlet and an air discharge coupling at one end, said casing having passage means connecting the inlet with the coupling, a pressure gauge mechanism in the casing and in cooperative relation with the passage means, there being provided in the casing an enlarged elongated chamber having seats at its opposite end, said inlet communicating with one of said seats, a valve reciprocally mounted in said chamber adapted normally to engage the latter seat, a spring positioned in said chamber between said valve and the other seat, the walls of the chamber having substantially longitudinal grooves converging with respect to each other from the seat engaged by the valve toward the other seat in the chamber.

In testimony whereof, I affix my signature this 5th day of January, 1928.

CHARLES H. COX.